Sept. 19, 1967  E. E. SCOTT  3,343,012
OSCILLATING MOTOR
Filed Aug. 3, 1964  3 Sheets-Sheet 1

ELMER E. SCOTT
*INVENTOR.*

BY *Seed & Berry*

ATTORNEYS

Sept. 19, 1967   E. E. SCOTT   3,343,012
OSCILLATING MOTOR
Filed Aug. 3, 1964   3 Sheets-Sheet 2
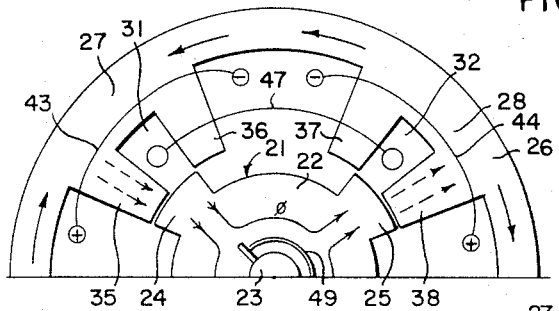
FIG.___5
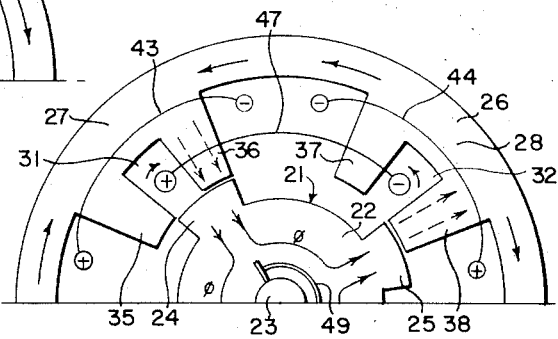
FIG.___6
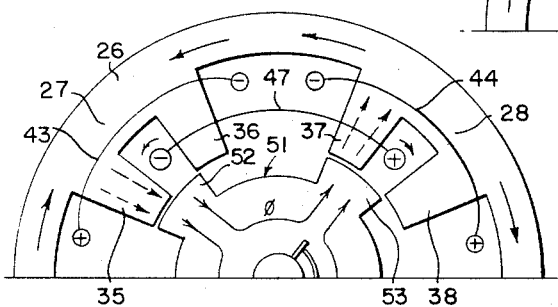
FIG.___7
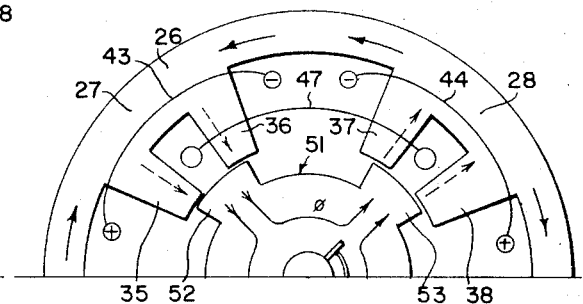
FIG.___8
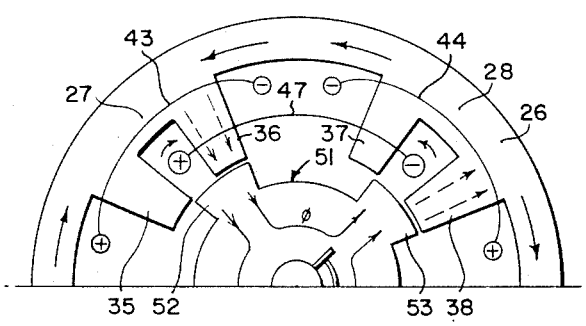
FIG.___9
ELMER E. SCOTT
INVENTOR.
BY Seed & Berry
ATTORNEYS

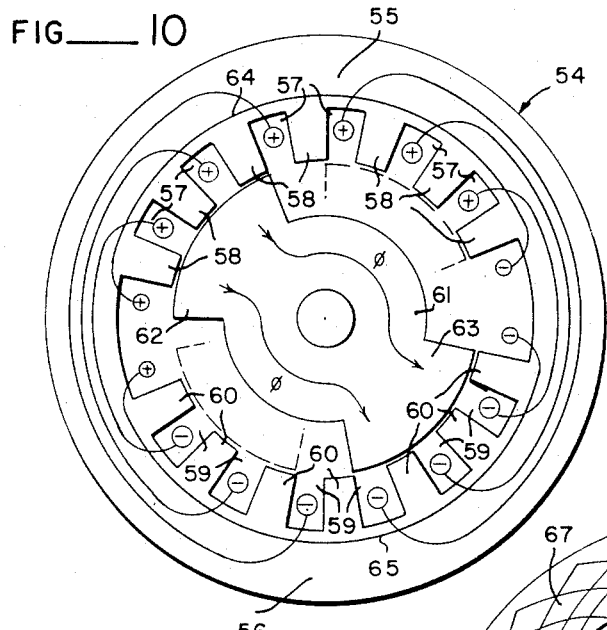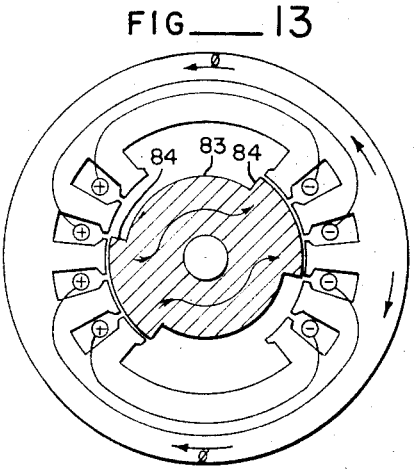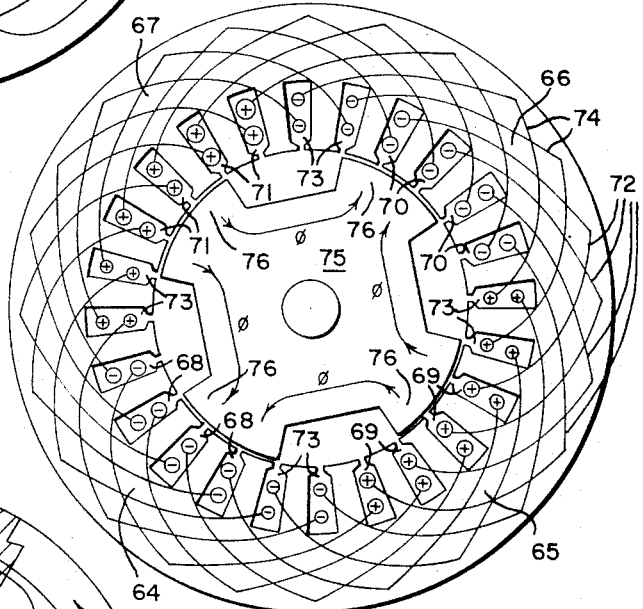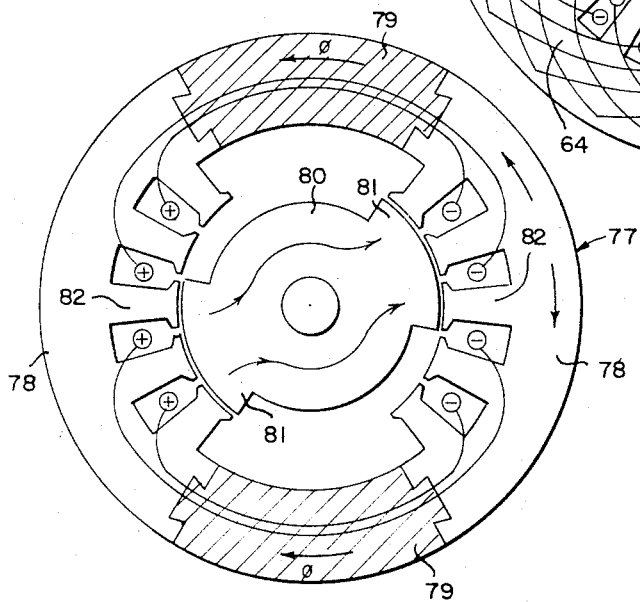

United States Patent Office 3,343,012
Patented Sept. 19, 1967

3,343,012
OSCILLATING MOTOR
Elmer E. Scott, 6602 Olympic Highway,
Aberdeen, Wash. 98520
Filed Aug. 3, 1964, Ser. No. 386,837
9 Claims. (Cl. 310—36)

The present invention relates to oscillating electrical motors in general and more specifically to a unique form of rotary oscillating motor for obtaining uniform thrust in both directions of oscillatory motion without the use of complicated mechanical linkages.

Many tools and machines require rotary oscillating motion to perform a desired function or work. No prior art device has yet been conceived for performing such a function directly in a dependable and efficient manner and hence such motion is usually obtained from conventional rotating motors with motion conversion systems. There is thus a definite need for a rotary oscillation motion means to provide such motion for driving machines directly without the use of motion conversion systems.

The present invention provides a motive means intended for use in driving such machines as agitators, mixers, separators, sifters, material feeders and the like in cases where rotary oscillation can more effectively accomplish the work than can other types of motion. In case of some fluids and semi-fluids, agitation can be more effectively accomplished with an oscillating agitator than with a rotating agitator. With some materials, sifting or separating is more efficient and faster with rotary oscillating motion than with linear or gyratory motion. Some material feeders and conveyors inherently utilize a rotary oscillation to operate. The motor of the present invention may also be used in connection with mechanical conversion devices for providing unidirectional rotation to produce slow speed rotation for driving machines requiring the same.

The rotary oscillating motor of the present invention operates on the same basic electro magnetic principles as described in my co-pending application Serial Number 386,836 entitled Oscillating Motor, filed August 3, 1964, and hence reference is made to the co-pending application for a detailed description of the operating principles. The present device utilizes the forces developed in a manner to cause a rotor to alternately rotate in one direction then in the reverse direction in rapid succession through an angle of something less than one half a revolution. The unit can be designed for any desired angle of rotation up to the order of 150° or 160°. As will be understood from the principles disclosed in my co-pending application, the present invention is inherently an alternating current device operating in synchronism with the power supply and making one complete oscillation for each cycle of power supply. It will also be understood that a multitude of variations are possible to meet various requirements of angle and torque. The oscillating frequency depends, of course, on the power supply frequency. The motor is commercially practical in ratings of considerable horsepower since there is no apparent upper limit to the ratings which can be built.

The rotary oscillating motor of the present invention consists essentially of a stator in which an armature (or rotor) rotates in alternate directions about a central axis, is supported by conventional bearings and has a torsion spring attached to provide resilient means to give the armature a natural period of rotary oscillation. The theory and basic principles involved in providing a resilient or elastic means to enable the armature to oscillate at mechanical resonance will be understood by those skilled in the mechanical arts upon reference to the disclosure in my co-pending application.

The primary object of the present invention, is therefore, to provide an alternating current motive means which produces a rotary oscillating motion and develops thrust in either direction of oscillation and which operates in synchronism with the power supply producing one complete oscillation for each cycle of power supply. This is contrasted with most existing rotary oscillation devices which develop thrust in only one direction.

A further object is to provide a motive means producing rotary oscillating motion that develops thrust in utilizing forces exerted on current carrying conductors in the presence of a unidirectional magnetic field, but where the attractive forces between poles of unlike polarity are not utilized.

Another object of the present invention is to provide a rotary oscillation motive means that permits the main, or energizing winding to be connected directly to a conventional alternating current power supply without the need of interposed auxiliary devices of any form, in which contacts, controlled and/or uncontrolled interrupters electronic tubes or semi-conducting devices and their associated maintenance are no longer necessary.

Another object of the present invention is to provide a rotary oscillating motor with all necessary electrical windings being supported in the stator; with no windings on the armature thus making flexible leads or moving contacts to the armature unnecessary.

Another object of the present invention is to provide a rotary oscillating motor in which the periphery of the armature moves in a direction perpendicular to the axes of the stator pole pieces with the air gap between stator pole pieces and armature poles remaining constant throughout the entire stroke, thus permitting a constant unidirectional magnetic flux in the magnetic circuit irrespective of the length of stroke or angle of oscillation.

Another object of the present invention is to provide a rotary oscillating motor in which the unidirectional magnetic flux is established by winding separate from the energizing winding and supplied with a unidirectional current to relieve the energizing windings from supplying the magnetic field which would add a highly lagging component of current to the energizing winding current required to do work.

Another object of the present invention is that of providing a rotary oscillating motor in which the unidirectional magnetic field is furnished by permanent magnets, hence the separate excitation windings and direct current power supply are no longer necessary.

Another object of the present invention is to provide a rotary oscillating motive means which is inherently incapable of producing radio frequency interference of any form.

Another object of the present invention is to provide a rotary oscillating motor that takes a current of essentially sine wave form when energized from an alternating current power supply with sine wave form of commercial quality.

A further and important object of the present invention is to provide a rotary oscillating motor with efficiency, power factor and line current that are comparable to those of rotating motors such as induction and universal motors of comparable size, in contrast to these characteristics which are relatively poor in existing forms of oscillating motors, thus making practical relatively large horsepower ratings of this new type of motor.

A further object of the present invention is to provide a rotary oscillating motor in which long strokes and larger armature masses are possible by the use of a torsion spring means acting on the armature shaft where the period of oscillation is determined by the mass of the oscillating parts and compliance of the elastic means, and which period of oscillation coincides with that of the electrical power supply so the motor operates in mechanical resonance. The high accelerating forces necessary to give rotary oscillating motion to the armature at the desired stroke and frequency are in this way furnished by the elastic torsion means, leaving only the losses and useful work forces to be supplied by the electrical windings.

A further object of the present invention is to provide a rotary oscillating motor means producing rotary oscillating motion of a certain maximum stroke which stroke can be varied over a range of zero to the maximum by a variation of the alternating current voltage applied to the energizing windings.

A further object of the present invention is to provide a rotary oscillating motive means which not only serves to convert electrical energy into rotary oscillating motion, but also serves to convert rotary oscillating motion into electrical energy, thus serving as an oscillating generator as well as a motor. As an oscillating generator the device, when driven by a rotary oscillating power source, generates one cycle of alternating current for each complete oscillation of the armature.

A still further object of the present invention is to provide a rotary oscillating motor, the many forms of which are not only suitable for operation on full wave current, but all forms of which are adaptable, with modifications of the energizing windings and the use of a bi-phase half wave (2 element) inverter, to operation on direct current power supplies.

The means by which the foregoing objects and other advantages, which will be apparent to those skilled in the art are accomplished, are set forth in the following specification and claims, and are illustrated in the accompanying drawings.

Reference is made now to the drawings in which:

FIGS. 4–6 illustrate a first form of rotary oscillating motor showing various positions during one stroke;

FIGS. 7–9 illustrate a second form of rotary oscillating motro showing various positions during one stroke;

FIG. 10 illustrates a third form of the oscillating motor;

FIG. 11 illustrates a fourth form of the invention utilizing a partially closed slot arrangement;

FIG. 12 illustrates a fifth form of the invention utilizing a permanent magnet in the stator; and FIG. 13 illustrates a sixth form of the invention utilizing a permanent magnet in the rotor.

Figure 1:
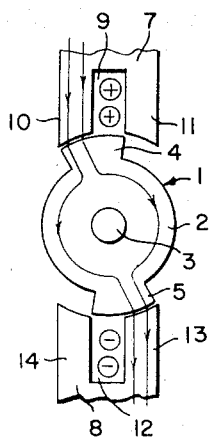
FIGS. 1–3 illustrate the basic electro magnetic principle of the invention.
Figure 2:
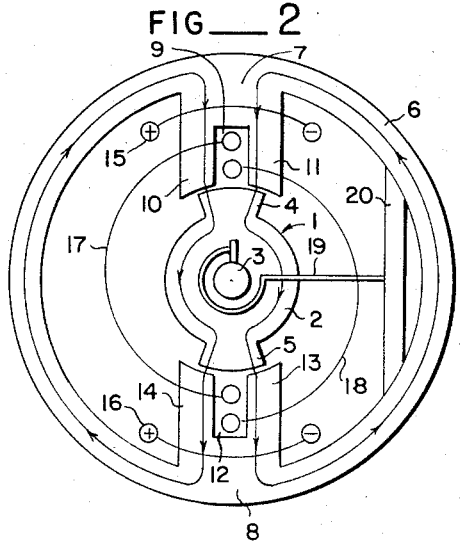
Figure 3:
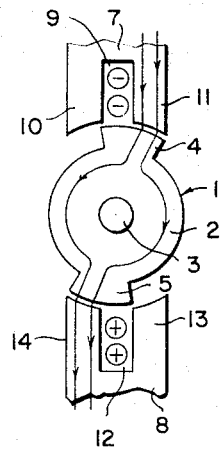

Before describing specific embodiments of the present invention, reference is made to FIGS. 1 through 3 for an understanding of the basic manner in which the rotary oscillating motion is obtained. For ease of understanding, the oscillating motor has been illustrated in FIGS. 1 to 3 in schematic form with emphasis being placed upon the electro magnetic features since details such as bearings, housings, frame, enclosure and the like may be provided according to any particular design and are not of concern to the present invention.

Referring specifically to FIG. 2, the device comprises a rotor indicated generally at 1 which includes a circular center portion 2 fixed to a rotatably mounted shaft 3. The rotor 1 comprises the armature portion of the motor and also includes armature segments 4 and 5 which are diametrically opposed and carried on the outside periphery of the central portion 2. The rotor 1 will be constructed of any magnetic material such as iron or other material chosen for its magnetic characteristics. The stator portion of the motor is in the form of a circular stator piece 6 which surrounds the rotor 1 and is concentric therewith. The stator piece 6 includes an upper pole piece 7 and a lower pole piece 8 integral therewith. The upper pole piece 7 includes a slot 9 which results in the formation of teeth 10 and 11 on the pole piece and likewise, the pole piece 8 includes a slot 12 resulting in the formation of teeth 13 and 14 on the lower pole piece. The magnetic circuit is established by means of an upper excitation field coil 15 and a lower field coil 16 with the coils 15 and 16 being located about the pole pieces 7 and 8 respectively. It will be understood that the field coils 15 and 16 are connected to a suitable source of direct current with the polarity as indicated in FIG. 2. With this arrangement, the magnetic flux flows in the direction indicated by the arrows in FIG. 2 and is distributed within the teeth of the pole pieces as illustrated. It will be noted that the unidirectional magnetic flux flows downward through the upper pole piece 7, through the rotor or armature and armature segments and into the pole piece 8.

Each of the slots 9 and 12 contain conductors forming the energizing coils 17 and 18 with the conductors in the slots of the lower pole pieces being of opposite polarity to that of the current in the conductors in the upper pole piece and with each of the coils being supplied with alternating current. FIG. 2 illustrates the center or rest position of the rotor or armature 1 and, at this point, it will be assumed that the current is zero in all of the conductors of the energizing coils. Thus, the magnetic flux is evenly distributed within the teeth of each of the pole pieces and the rotor is located in the centered position as indicated.

In addition to the structure described, any form of torsion spring such as the spring 19 is connected to the shaft 3 and anchored to any stationary portion of the motor housing, not shown, or the stator frame by such means as the member 20. As aforementioned, the spring 19 provides the necessary acceleration and will be designed to allow the rotor 1 and the shaft 3 to oscillate at mechanical resonance.

It should be mentioned that for ease of explanation in all instances in the present specification, the motor is shown under a theoretical no-load condition where the rest or centered position of the armature coincides with the theoretical zero current in the energizing conductors. Under loaded conditions, the alternating current will, of course, be slightly out of phase with the displacement of the armature segments so that reversal of current will not occur exactly at the rest or centered position of the armature segments. Following through one stroke of the motor as illustrated progressively in FIGS. 1, 2 and 3, and referring first to FIG. 1, with the current in the conductors of the energizing coils 17 and 18 flowing in the direction indicated, the magnetic flux is diverted to the left tooth 10 of the pole piece 7 causing the armature segment 4 to align itself with the tooth 10. As the alternating current in coils 17 and 18 drops, the magnetic flux is distributed within both of the pole teeth 10 and 11 and the rotor 1 is returned to the rest position shown in FIG. 2. When the alternating current in the energizing coils reverses, as shown in FIG. 3 the magnetic flux is diverted to the opposite side of the pole 7 and is concentrated in the tooth 11 and thus the armature segment 4 aligns itself with the right tooth 11 as shown in FIG. 3. Since the segments 4 and 5 are a part of the armature and pivoted at the central axis of the shaft 3, the armature rotates alternately clockwise and counterclockwise through an angle and in synchromism with the current in conductors of the energizing coils 17 and 18. Since the current in the conductors in the slot 12 of the pole 8 is of opposite polarity to that of the current in the conductors in the slot 9 of the pole 7, the same flux transfer occurs simultaneously in the lower armature segment and pole piece. This is essential to provide torque in the same direction about the axis with thrust being exerted on both armature segments.

Since the rotor 1 necessarily has some mass, which includes the weight of the armature segments and any other associated parts of the rotor, for the armature segments to oscillate at some frequency will require accelerating forces to bring the armature up to velocity, then decelerate it and reverse it at the end of the stroke. Where the mass of the rotor and associated armature segments is relatively small, the accelerating forces may be small and may be supplied by the electromagnetic action. These forces must be sufficient for both acceleration and to do useful work. In the event of larger masses (armature having more weight) the accelerating forces may be in excess of the magnetic forces available. In this instance, and as shown in FIG. 2, it is desirable to use an elastic medium such as the spring 19 with such characteristics as to permit the rotor or armature unit to oscillate at its natural period of mechanical frequency commonly known as resonant frequency.

The rotary oscillating motor of the present invention may be built in a multitude of forms. It may utilize any even number of poles as in the case of conventional rotating induction and synchronous motors. Each of these poles may contain any desired number of slots. The slots may be of the open type or the conventionally used partially closed type. More than one armature can be used with a given stator design; the number of different armatures adaptable is dependent upon the number of slots per pole. The unidirectional magnetic field flux may be established by either electromagnetic means or by permanent magnet means. In the case of the permanent magnet type of unit, the permanent magnet may be incorporated in the stator portion of the magnetic circuit or may form the armature portion of the magnetic circuit.

Figure 4:
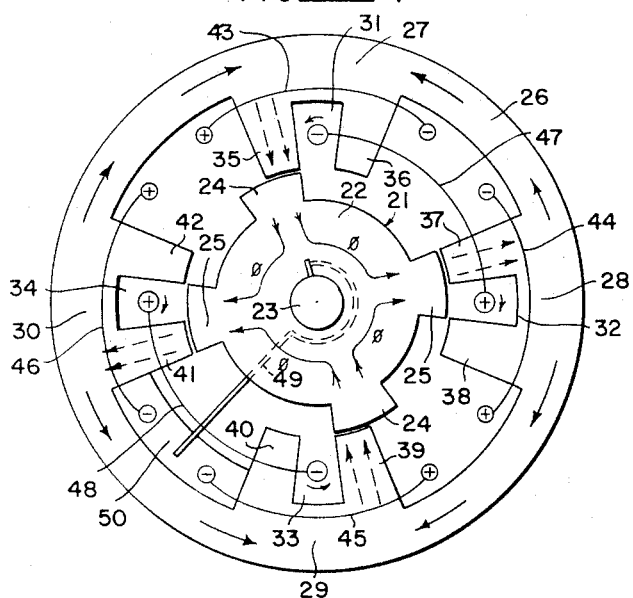

The first embodiment of the invention is illustrated in FIGS. 4–6 of the drawings and constitutes a four pole motor with each pole containing one slot of the open type. The armature of the motor shown in FIG. 4 is of the "alternate type" wherein the flux transfer occurs alternately in the pole pieces and wherein torque is produced alternately on the armature segments as will be explained. To illustrate the alternate transfer of flux and application of torque, FIGS. 4, 5 and 6 illustrate the various positions of the armature throughout one full stroke of the motor. Referring first of all to FIG. 4 for the general overall structure, the four pole alternate flux transfer rotor unit comprises a rotor unit 21 having a circular central portion 22 mounted for rotation on the shaft 23 and it will be understood that the shaft 23 may be provided with any conventional bearing means. Mounted on the outside periphery of the central portions 22 is a first pair of diametrically opposed armature segments 24 and a second pair of such segments 25.

The stator portion of the motor comprises the circular stator piece 26 which is provided with uniformly spaced pole pieces 27, 28, 29 and 30 which extend inwardly from the inner periphery of the stator piece 26. The pole pieces 27 and 28 each contain a slot 31 and 32 respectively and likewise the pole pieces 29 and 30 are provided with slots 33 and 34 respectively. The structure described thus far may be characterized as a four pole one slot per pole arrangement with the particular spacing of the armature segments 24 and 25 providing the alternate form of flux transfer which will be described. To continue, the slot in each pole piece provides a pole piece with two distinct teeth thus; pole piece 27 includes the teeeth 35 and 36; pole piece 28 includes the teeth 37 and 38; pole piece 29 includes the teeth 39 and 40; and pole piece 30 includes the teeth 41 and 42. Unidirectional magnetic flux paths are set up through the various pole pieces by means of the field coil 43 located about pole piece 27; field coil 44 located about pole piece 28; field coil 45 located about pole piece 29; and field coil 46 located about pole piece 30. The unidirectional magnetic fields are completed through the stator piece 26 and the central portion 22 of the rotor or armature as indicated by the arrows in FIG. 4 which represent the flux lines.

As illustrated in FIG. 4, the two pole pieces 27 and 28 are to be considered as a pair of pole pieces acting on two of the armature segments 24 and 25 with the remaining two poles 29 and 30 acting on the remaining two pole pieces 24 and 25 in exactly the same manner, as will be apparent from the description to follow. This being true it is necessary only to talk about two of the paired pole pieces and associated armature segments since the remaining poles pieces and armature segments function in the same manner during the strokes of the motor. The two pole pieces 27 and 28 are linked by the energizing coil 47 with the conductors thereof being located in the slots 31 and 32. In a like manner, the poles 29 and 30 are linked by the energizing coil 48 with the conductors thereof located in slots 33 and 34 respectively. The energizing coils 47 and 48 are supplied with alternating current from a suitable source and it will be noted that with the arrangement shown, the polarity of the current in the conductors in adjacent pole pieces is different and the polarity in the conductors in diametrically opposing slots of the various pole pieces is of like nature. The reason for this arrangement will be apparent from the following description of the action of the motor.

It will be noted that the motor shown in FIG. 4 includes an armature with segments of one pitch with the designation of one pitch indicating the arcuate distance between center lines of the pole teeth. It will be seen that the arcuate distance or angle between center lines of the armature segments 24 and 25 is offset the arcuate distance or angle of one tooth greater than the distance between center lines of the pole-pieces. This spacing is essential to obtain the alternate flux transfer desired. To complete the structure of the motor shown in FIG. 4, a torsion spring 49 may be coupled to the rotary shaft 23 and anchored to any stationary part of the motor frame or stator as indicated at 50 in order to allow the rotor to oscillate at mechanical resonance.

Following through the operation of one stroke of the motor, reference is made to FIGS. 4, 5 and 6 which show the progressive movements of the rotor during one stroke. FIG. 4 shows the extreme counterclockwise position of the rotor with the alternating current in the coils 47 and 48 having the polarity indicated. FIG. 5 shows the midstroke or rest position of the rotor at which time the current in the energizing coils is assumed to be zero and FIG. 6 shows the extreme clockwise position of rotation of the rotor upon the reversing of the current in the A.C. coils 47 and 48. Considering only the armature segments 24 and 25 associated with the pole pieces 27 and 28 and referring again to FIG. 4, the rotor is shown in its extreme counterclockwise rotated position with the flux transfer or path being through the pole teeth 35 and 37 with the polarity of the current in the coil 47 being as indicated. Proceeding to FIG. 5, and assuming that the current in the coil 47 has dropped to zero, the flux path in the pole 28 shifts to the pole tooth 38 exerting thrust on the armature segment 25. Moving to FIG. 5, and with the A.C. current in the coil 47 being reversed, the flux path in the pole 27 shifts to the tooth 36 applying thrust to the armature segment 24 while the flux path in the pole piece 28 remains unchanged. Thus it will be seen that the total angle of oscillation of the rotor is equal to one times the tooth pitch or 30° amplitude in the specific unit illustrated.

FIGS. 7, 8 and 9 illustrate a second form of the invention wherein the identical stator structure including pole pieces, excitation field coils and energizing coils are utilized but wherein the rotor 21 has been replaced by a second type of rotor or armature 51 to produce "simultaneous" flux transfer within the pole pieces and simultaneous thrust upon the armature segments since the segments are so spaced as to come in register with corresponding portions of the poles simultaneously. With the simultaneous form shown in FIGS. 7 through 9, the angle of oscilaltion is half that of the alternate form just described with a stroke of one-half the tooth pitch or a toal stroke of 15°. It is noted that only one-half of the motor is shown in FIGS. 7–9 which is sufficient for understanding the flux transfer and the action of the rotor.

The rotor 51 in FIGS. 7, 8 and 9 is identical to the rotor in FIGS. 4, 5 and 6 except for the placement of the armature segments 52 and 53 which have center lines with the same angular displacement on the rotor as the angular displacement between center lines of the pole pieces 27 and 28. FIG. 7 illustrates the extreme counterclockwise rotative position of the rotor 51 wherein the flux path is through the tooth 35 which is aligned with the segment 52 and the tooth 37 which is aligned with the segment 53. Under these conditions, the polarity in the energizing coil 47 is as indicated, with torque having been applied to both of the armature segments 52 and 53 to align them with the teeth 35 and 37 respectively. As the current in the energizing coil 47 drops to zero, FIG. 8, the magnetic flux divides equally in the teeth 35 and 36 and 37 and 38 to allow the rotor to move the center or rest position, with torque again being applied to both armature segments. As the rotor 51 moves to the extreme clockwise rotative position shown in FIG. 9, and with the polarity in the energizing winding 47 being reversed from that shown in FIG. 7, the flux path shifts to the right teeth 36 and 38 of both pole pieces 27 and 28 simultaneously and torque is applied to each armature segment simultaneously since they register with the pole teeth simultaneously. Thus it will be seen that the total angle of oscillation in the simultaneous form shown in FIGS. 7 through 9 is one-half the tooth pitch of 15° for the simultaneous flux transfer unit. With the simultaneous form described, the torque is twice as great as with the alternate form and, since the horsepower output is proportional the product of the angular amplitude and torque, the two units are capable of equal power output. The following table is a comparison of the two basic types or rotary oscillating motor thus far described:

TABLE 1

| Armature | Amplitude (pitch) | Angle of Oscillation (no load) | Units, Torque (c.) | Units, H.P., (K.) |
| --- | --- | --- | --- | --- |
| 1 Pitch, Alt | ½ | 1 P, 30° | 2 | 2 |
| 1 Pitch, Simult | ¼ | ½ P, 15° | 4 | 2 |

Having described the basic operation of both an "alternate" and a "simultaneous" form of rotor and armature arrangement as applied to a four pole one slot stator with reference to FIGS. 4 through 9, it will be apparent to those skilled in the art that rotary oscillating motors according to the present invention may be designed to utilize any even number of pole pieces as in the case of conventional rotating induction and synchronous motors. As previously mentioned, each of the poles, regardless of the number used, may contain any desired number of slots and more than one armature type can be used with a given stator design; the number of different armatures adaptable being dependent upon the number of slots per pole. It will be also apparent that, when utilizing multiple slots per pole, the total angle of oscillation will be dependent upon the armature pitch of the rotor, referring to the pitch distance as the distance between the center lines of teeth of the pole pieces. Thus, a one pitch armature arrangement will give the largest angle of oscillation and the angle of oscillation will be decreased by using multiple pitch aramature segments. FIG. 10 illustrates a two pole stator with six slots per pole and with an armature of the "alternate" flux transfer type and with the armature having segments of a three pitch width.

As shown in FIG. 10, the stator portion 54 is provided with a top pole piece 55 and a bottom pole piece 56 with the pole piece 55 having six identical slots 57 forming a total of seven teeth 58. In like manner, the pole piece 56 is provided with six identical slots 59 forming seven teeth 60. The rotor 61 is provided with two armature segments 62 and 63 which are offset one-half tooth pitch, one tooth width, to provide "alternate" flux transfer as previously described. The armaturs segments 62 and 63 extend through an angle equal to three pitch. The energizing coils are wound as illustrated and the magnetic field is provided by the two field coils 64 and 65. FIG. 10 illustrates the armature in the counterclockwise direction with the extreme clockwise rotative position indicated by the dotted line positions of the armature segments producing a stroke of 90°. The following table is offered to show the various values of angle of oscillation, torque and horsepower output for seven different armature designs which may be used with the stator illustrated in FIG. 10.

TABLE 2

| Armature | Amplitude (pitch) | Angle of Oscillation (deg.) (no load) | Units, Torque (c.) | Units, H.P., (K.) |
| --- | --- | --- | --- | --- |
| 1 Pitch, Alt | 3 | 135 | 1 | 6 |
| 2 Pitch, Alt | 2½ | 112 | 2 | 10 |
| 3 Pitch, Alt | 2 | 90 | 3 | 12 |
| 4 Pitch, Alt | 1½ | 67 | 4 | 12 |
| 5 Pitch, Alt | 1 | 45 | 5 | 10 |
| 6 Pitch, Alt | ½ | 22½ | 6 | 6 |
| 6 Pitch, Simult | ¼ | 11¼ | 12 | 6 |

Since partially closed slots may be incorporated in the design of rotary oscillating motors, conventional rotating motor stator laminations may be used for the stator of the rotary oscillating motor of the present invention. For example, FIG. 11 illustrates a conventional twenty-four slot stator lamination serving as a stator for a four pole oscillating motor. Each pole 64, 65, 66 and 67 consists of four slots. Thus, pole 64 is provided with four slots 68; pole 65 has four slots 69; pole 66 has four slots 70; and pole 67 has four slots 71. Each of the slots contains alternating current windings 72 as illustrated and the remaining slots 73 between poles are used for direct current windings 74 as illustrated to establish the unidirectional magnetic field flux within the poles. The rotor 75 is provided with four armature segments 76 of a three pitch design with the rotor being shown in the counterclockwise direction in FIG. 11. The clockwise limit of rotation from the position shown in FIG. 11 is the distance of two teeth (or 2 times the tooth pitch), thus operating with an angular amplitude of 15° and an angle of oscillation of 30°. The following table illustrates data for four different armatures which can be used with this stator design giving angles of oscillation from 15° to 60°.

TABLE 3

| Armature | Amplitude (pitch) | Angle of Oscillation (deg.) (no load) | Units, Torque (c.) | Units, H.P., (K.) |
| --- | --- | --- | --- | --- |
| 1 Pitch, Alt | 2 | 60 | 4 | 16 |
| 2 Pitch, Alt | 1½ | 45 | 8 | 24 |
| 3 Pitch, Alt | 1 | 30 | 12 | 24 |
| 4 Pitch, Alt | ½ | 15 | 16 | 16 |

FIG. 12 illustrates a previously mentioned form of the rotary oscillating motor of the present invention which utilizes a permanent magnet to establish the unidirectional magnetic field with the permanent magnet being located in the stator portion of the motor. While it will be understood that any form of the rotary oscillating motor may utilize permanent magnets in lieu of electromagnets, FIG. 12 shows a two pole motor with four partially closed slots per pole. The stator portion 77 of the motor shown in FIG. 12 has the same general overall shape as the stators previously described but includes the arcuate stator portions 78 with the permanent magnets 79 incorporated in the stator between the arcuate portions 78 in order to establish the magnetic circuit with the rotor 80 and armature segments 81 with the magnetic flux lines indicated by the arrows to show the magnetic path between the two poles 82 of the arcuate segments 78. The operation of this motor unit is the same as those with the electromagnetic field being established by field coils as described in previous embodiments. In case of the embodiments shown in FIG. 12, the field power supply for the field coils may be omitted. The following table shows the angular amplitude for the particular stator design shown in FIG. 12 with a range of 22½ to 90° angle of oscillation being possible by the four different armatures noted in the table:

TABLE 4

| Armature | Amplitude (pitch) | Angle of Oscillation (deg.) (no load) | Units, Torque (c.) | Units, H.P., (K.)' |
| --- | --- | --- | --- | --- |
| 1 Pitch, Simult | 2 | 90 | 2 | 8 |
| 2 Pitch, Simult | 1½ | 67½ | 4 | 12 |
| 3 Pitch, Simult | 1 | 45 | 6 | 12 |
| 4 Pitch, Simult | ½ | 22½ | 8 | 8 |

It will be evident from the above table that, by changing the tooth pitch and number of teeth (and slots per pole) the actual values indicated in the table can be increased or decreased as desired.

FIG. 13 illustrates another form of the present invention which is identical in all respects to that shown in FIG. 12 except that the permanent magnets 79 have been eliminated and a new type rotor 83 has been substituted for the rotor 80 shown in FIG. 12. In this variation, the rotor 83 and armature segments 84 form the permanent magnet which maintains the unidirectional magnetic circuit with flux lines as indicated by the arrows. It will be noted that the permanent magnet rotor 83 and armature segments 84 must be magnetized in a direction as indicated so as to form poles of the armature segments 84. The operation of the motor unit shown in FIG. 13 is the same as for the unit illustrated in FIG. 12 and lends itself to the use of conventional stator laminations.

It is well to note also that in all forms of the rotary oscillating motor described herein, the amplitude of the rotor may be varied from zero to a maximum design angle by adjusting the voltage applied to the alternating current energizing windings. In addition, variations of the maximum (or no load) angle of oscillation may be obtained by the changing of tooth pitch, number of teeth (and slots per pole) as described. It will also be understood by those skilled in the electrical and mechanical arts, that by mechanically driving the rotor of the rotary oscillating motor in all forms, whether electromagentic or permanent magnet, open or closed slot, the device will serve as an oscillating generator delivering one cycle of alternating current for each complete oscillation of the armature.

It will be readily apparent to those skilled in the art of electrical motors and generators and especially rotary oscillating motors and generators, that the present invention provides novel and useful improvements in such devices. It is also to be understood that structures described and claimed herein apply equally to electrical generators as well as motors. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. An oscillating motor comprising; at least one pair of fixed magnetic poles with an air gap therebetween, each of said poles including at least one slot forming a plurality of teeth thereon, an armature, means for mounting said armature for rotary oscillation at mechanical resonance about a fixed axis in said air gap, said armature being so positioned relative to said teeth as to maintain a reluctance of essentially constant magnitude during oscillation, means to establish a unidirectional magnetic circuit of essentially constant magnitude through said poles and said armature, and alternating current conductors in said slots, whereby current in said conductors will alternately divert the magnetic flux from one to another of said teeth to apply torque on said armature alternately in opposite directions to produce oscillation.

2. The device according to claim 1 wherein; said armature includes armature segments on the periphery thereof adjacent each pole piece, said segments being spaced on center lines having the same arcuate spacing as the center lines of said pole pieces.

3. The device according to claim 1 wherein; said armature includes armature segments on the periphery thereof adjacent each pole piece, said segments being spaced on center lines offset the arcuate width of one tooth from the center line spacing of said pole pieces, whereby the flux paths are diverted alternately in one pole and then the other resulting in the application of torque alternately on one armature segment and then the other throughout the stroke.

4. An oscillating motor comprising; a pair of fixed magnetic pole pieces with an air gap therebetween, each of said pole pieces including a slot therein to form spaced teeth thereon, conductors located in said slots, said conductors being fixed relative to associated pole pieces, means to induce alternating current in said conductors, said alternating current being of opposite polarity in the respective pole pieces, an armature of magnetic material, means for mounting said armature for rotary oscillation about a fixed axis in said air gap, and means to establish a unidirectional magnetic circuit of essentially constant magnitude through said pole pieces and said armature, said armature being so positioned relative to said teeth as to maintain a reluctance of essentially constant magnitude between said poles and said armature during oscillation, whereby the magnetic field produced by alternating current in said conductors will divert the magnetic flux in said pole pieces from right to left sides thereof causing said armature to oscillate to right and left of a center position with thrust being applied to said armature alternately in opposite directions of oscillation.

5. The device according to claim 4 wherein, said armature includes armature segments on the periphery thereof adjacent each pole piece, said segments being spaced on center lines having the same arcuate spacing as the center lines of said pole pieces.

6. The device according to claim 4 wherein said armature includes armature segments on the periphery thereof adjacent each pole piece, said segments being spaced on center lines offset the arcuate width of one tooth from the center line spacing of said pole pieces, whereby the flux paths are diverted alternately in one pole and then the other resulting in the application of torque alternately on one armature segment and then the other throughout the stroke.

7. An oscillating motor comprising; a circular stator ring member; said stator member including a plurality of pairs of diametrically opposed pole pieces extending inwardly therefrom with air gaps therebetween, each of said pole pieces including at least one slot therein to form spaced teeth thereon, conductors located in said slots and being fixed relative thereto, means to apply alternating current in said conductors, the alternating current being of opposite polarity in adjacent pole pieces, an armature of magnetic material, means for mounting said armature for rotary oscillation about a fixed axis in said air gap, said armature having a number of arcuate armature segments on the periphery thereof corresponding to the number of pole pieces with each segment being adjacent a respective one of said pole pieces, the arcuate extent of said segments being in multiples of the arcuate distance between center lines of the teeth of associated pole pieces said armature segments being so positioned relative to the associated pole pieces so as to maintain a reluctance of essentially constant magnitude between the armature and the pole piece during oscillation, and means to establish a unidirectional magnetic circuit of essentially constant magnitude through said pole pieces and said armature, whereby the magnetic field produced by alternating current in said conductors will divert the magnetic flux in said pole pieces alternately from right to left sides thereof causing said armature to oscillate to right and left of a center position with thrust being applied to said armature alternately in opposite directions of oscillation.

8. The device according to claim 7 wherein, said segments are spaced on center lines offset the arcuate width of one tooth from the center line spacing of said pole pieces, whereby the flux paths are diverted alternately in one pole and then the other resulting in the application of torque alternately on one armature segment and then the other throughout the stroke.

9. The device according to claim 7 wherein, each of said poles is provided with a single slot, and wherein the arcuate extent of said segments is equal to the arcuate distance between center lines of teeth of associated pole pieces, said segments being spaced on center lines having the same arcuate spacing as the center lines of said pole pieces.

References Cited

UNITED STATES PATENTS

| Re. 25,934 | 12/1965 | Chausson | 310—36 X |
| 1,202,446 | 10/1916 | Speed | 310—38 |
| 1,739,885 | 12/1929 | Zbinder | 310—38 |
| 2,668,251 | 2/1954 | List | 317—165 X |
| 2,960,643 | 11/1960 | Boyd | 318—124 |

FOREIGN PATENTS 410,154  5/1934  Great Britain.

OTHER REFERENCES

IBM Technical Disclosure Bulletin; vol. 6, No. 9, February 1964, pp. 19–20.

MILTON O. HIRSHFIELD, *Primary Examiner.*

D. F. DUGGAN, *Assistant Examiner.*